May 12, 1942.   H. C. SWIFT   2,282,620

BRAKE

Filed Jan. 16, 1941

INVENTOR.
HARVEY C. SWIFT
BY O. H. Fowler
ATTORNEY

Patented May 12, 1942

2,282,620

UNITED STATES PATENT OFFICE 2,282,620

BRAKE

Harvey C. Swift, Detroit, Mich., assignor to Hydraulic Brake Company, Detroit, Mich., a corporation of California Application January 16, 1941, Serial No. 374,753

8 Claims. (Cl. 188—79.5)

This invention relates to brakes, and more specifically to automatic adjusters for the friction elements thereof.

Broadly the invention comprehends means for automatically adjusting the friction elements or shoes of an internal expanding brake to compensate for wear on the linings of the shoes due to repeated braking operations.

Generally in the type of automatic adjusting means wherein the operation is dependent upon a differential of wear on the friction linings of the shoes and a member frictionally clamped to the shoes and adapted for cooperation with the drum, and an adjustable retractile stop for maintaining the shoes in proper spaced relation to the drum, when the brake is at rest, a considerable force is required to move the frictionally clamped member relative to the shoe. It is also understood that because of the tension of the retractile spring connecting the shoes, there is a tendency to displacement of the frictionally clamped members when the shoes are returned to their retracted position. Accordingly, it becomes necessary for the frictional resistance to movement of the members to exceed the load on the retractile stops, otherwise an underadjustment would result. It is the aim of the present invention to overcome this objection.

An object of the invention is to provide means for automatically adjusting the friction elements or shoes of a brake to compensate for wear on the frictional linings of the shoes, operative to avoid improper adjustment thereof.

A feature of the invention is a member supported on a friction element movable relative thereto and cooperating with a drum and an adjustable retractile stop and means interposed between the member and the stop for inhibiting retrograde movement of the member.

Another feature of the invention is a non-frictional member of impervious material, preferably a ceramic member of fine texture and high compressive strength having one side diagonally disposed with relation to the profile of the member adapted to slidably engage an arm rotatable on a pin carried by the force transmitting end of a lever and a shell supporting the pin adapted to eliminate dust and other foreign substances.

More specifically the shell is fixed to the friction element or shoe and houses the ceramic member and forms a support for the movement of the member transversely of the shoe. The lever is fulcrumed on the web of the shoe within the shell and holds the member against its seat on the shell. Springs hold the lever adjacent its fulcrum and the member frictionally against the same side of the web of the shoe.

Further objects and features of the invention will appear from the following description taken in connection with the drawing forming a part of the specification and in which—

Figure 1:
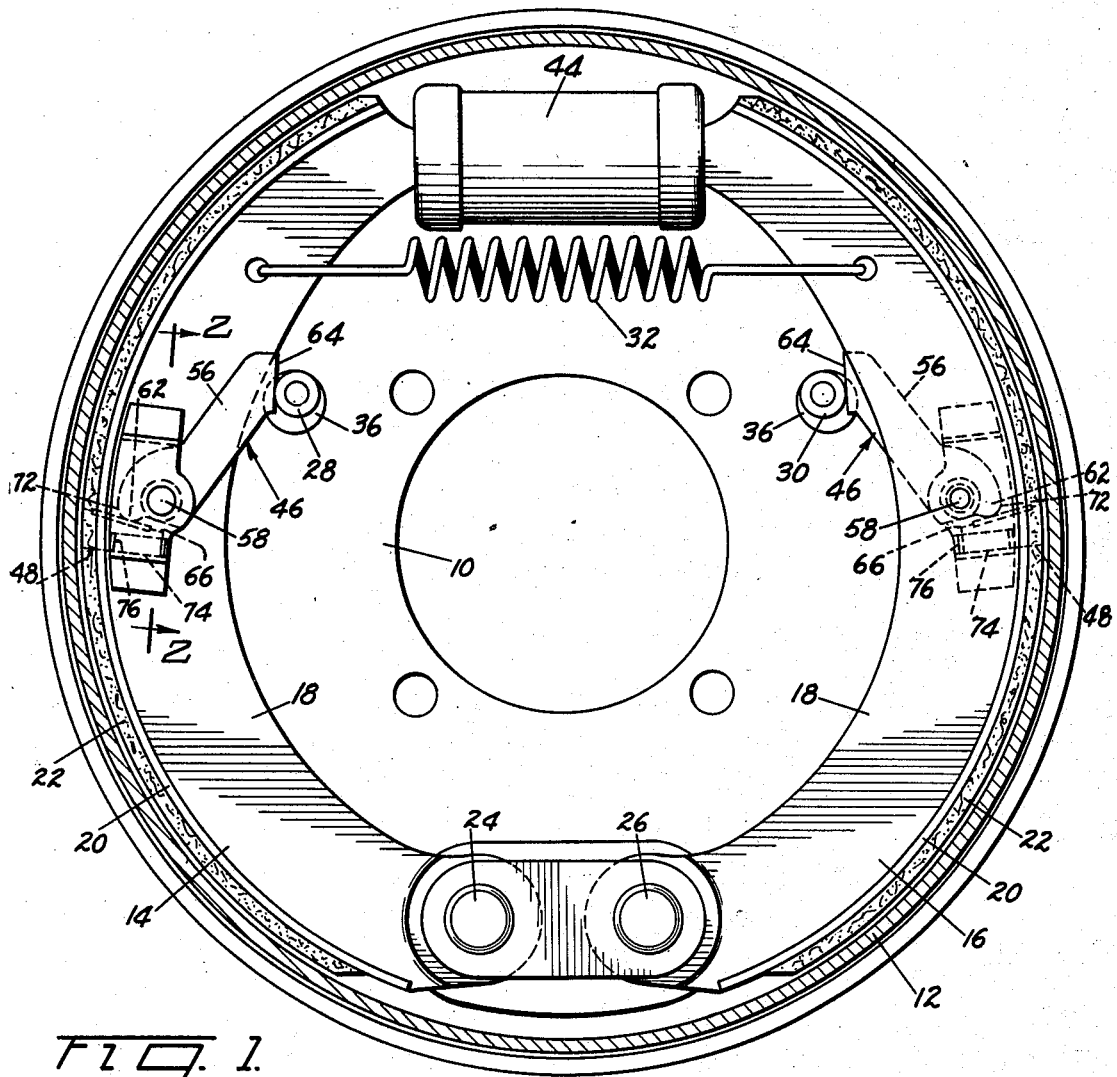
Fig. 1 is a vertical sectional view of a brake taken just back of the head of the drum illustrating the invention as applied.
Figure 2:
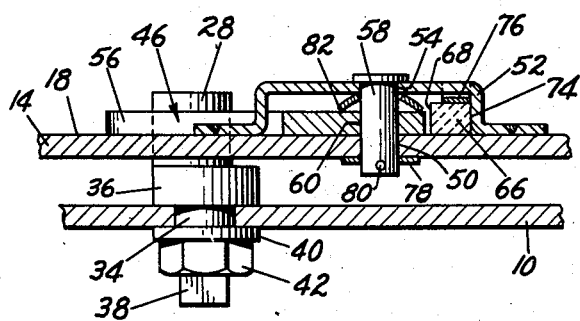
Fig. 2 is an enlarged sectional view substantially on line 2—2, Fig. 1.
Figure 3:
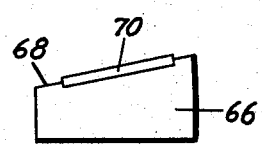
Fig. 3 is a top plan view of the ceramic block or drum engaging member.

Referring to the drawing for more specific details of the invention, 10 represents a fixed support or backing plate. Associated with the backing plate is a rotatable drum 12 and a pair of corresponding interchangeable friction elements or shoes 14 and 16 mounted on the backing plate for cooperation with the drum.

As shown, the shoes are of conventional type each including a web 18 supporting a rim 20 having suitably secured thereto frictional lining 22. The shoes 14 and 16 have their articulate ends pivotally mounted on spaced anchors 24 and 26 positioned on the backing plate, and corresponding adjustable retractile stops 28 and 30 also positioned on the backing plate support the shoes in proper spaced relation to the drum, when the brake is at rest.

A retractile spring 32 connecting the shoes 14 and 16 serves to return the shoes to the stops 28 and 30 upon conclusion of a braking operation and to retain the shoes on the stops when the brake is at rest. Each of the stops includes a shaft 34 rotatable in the backing plate 10. The shaft has thereon a collar 36 abutting the backing plate and flaps 38 on its free end for the reception of an adjusting tool. A washer 40 is sleeved on the shaft and a nut 42 threaded on the shaft serves to secure the assembly in the adjusted position.

A fluid pressure actuated motor 44 of conventional type mounted on the backing plate between the shoes 14 and 16 and adapted to be connected to a suitable source of fluid pressure is operated to actuate the shoes into engagement with the drum against the resistance of the retractile spring 32.

Mounted on the shoes in reverse position are automatic adjusters indicated generally at 46. As shown, the rims and the linings of the shoes are slotted as at 48. The webs of the shoes have bores 50 and arranged on the webs are shells 52 spot welded thereon, having bores 54 therethrough concentric to the bores in the webs. Each of the adjusters includes a lever 56 having as its fulcrum a pin 58 fitted in an opening 60 in the lever and coextensive with the bores 50 and 54 to permit rotation of the lever.

The lever 56 has an arm 62 of short radius and a driver end 64 suitable for engagement with the associated adjustable retractile stop.

A block 66 of impervious non-frictional material has a slotted diagonally disposed side 68 carrying a metal insert 70 therein, parallel the diagonally disposed side. One end of the block has a radius commensurate with the radius of the shoe and this end of the block is fitted for movement in the slot 48 through the rim and lining of the shoe and is adapted to engage the drum. The metal insert 70 on the diagonal side of the block bears against a curved portion 72 of the arm 62 of the lever. One side of the block slidably engages the inner wall 74 of the shell 52 and is pressed against the web of the shoe by an arch spring 76. A thin washer 78 flapped against the web of the shoe and a pin 80 passed diametrically through the pin 58 serve to hold the pin 58 in position as well as assist in clamping the lever to the web of the shoe by bearing upon the shell to place tension on a spring washer 82 received by the pin and inserted between the shell and the lever.

Due to the differential in the coefficient of friction of the lining and the block, in a normal braking operation there is relative movement between the shoe and the block. This movement of the block is proportionate to wear on the lining on the shoe and is transversely of the shoe against the resistance imposed by the spring 76, and during this movement force is transmitted by the diagonally disposed metal insert 70 to the arm 62 of the lever causing a rotation of the lever about its fulcrum point, the pin 58, so that upon conclusion of a braking operation and return of the shoe to retracted position the lever engages the retractile stop and supports the shoe in proper spaced relation to the drum. Because of the wedging action on the block between the wall 74 of the shell and the diagonally disposed metal side 70 of the block, retrograde movement of the block is inhibited. This is of vital importance because of the tendency to maladjustment of the brakes due to the snapping action of the retractile spring 32 connecting the shoes upon release of the brake at the conclusion of a braking operation.

To reduce wear on the drum to the minimum, the adjusters are arranged in reverse position with respect to one another so that in a given brake structure the wear on the drum may be spread over substantially twice the area of a drum structure wherein adjusters are arranged in diametrically opposite position to one another. This has another highly important advantage in that the adjusters may be alike in structure and accordingly the cost of production may be greatly reduced.

Wear on the drum is further and very materially reduced by the introduction of a drum engaging member of the character of the block 66. This block is made from impervious non-frictional material preferably a ceramic of fine texture, durable, high compressive strength, substantial, and wear resistant. In practice, the face of the block engaging the drum becomes impregnated with fine metallic particles and this results in polishing the face of the block to such a high degree that the abrasive properties of the block are reduced to a minimum.

It is to be clearly understood that applicant does not limit himself to any particular ceramic in the production of the drum engaging member or block. However, it is important that such ceramic as may be employed must be durable and substantial so as to withstand the shock and strain imposed thereon in brake structures.

In a normal operation, upon energization of the the motor 44, the shoes 14 and 16 are moved into engagement with the drum 12 against the resistance of the retractile spring 32 effectively retarding rotation of the drum. During this operation, the respective assemblies of the automatic adjusters 46 and the shoes 14 and 16 move as a unit.

Further movement of the shoes 14 and 16 into the drum 12 results from wear on the linings of the shoes due to successive engagement of the shoes with the drum. There is no undue unit pressure exerted on the blocks 66 in comparison to the unit pressure on the shoes, the wear on the drum engaging portion of the block is nil as compared to the wear on the linings 22 of the shoes, and this relative movement results between the blocks 66 and the shoes 14 and 16.

Movement of the blocks 66 is restricted to paths transversely of the shoes 14 and 16 by the wall 74 of the shells 52. Upon wear of the linings 22, the shoes are caused to assume new positions relative to the block 66 and levers 56. The movement of the blocks 66 upon wear of the linings 22 results in transmission of force through the block and metal insert to the arm 62 on the lever causing a clockwise rotation of the lever. Hence, when the driving arm 64 on the lever engages the associated stop, the shoe is supported in a newly adjusted position in proper spaced relation to the drum, ready for further braking operations.

Extremely small pressure is required to move the blocks 66 inwardly; whereas, outward movement is inhibited due to the frictional resistance imposed by the spring 76, and movement of the block when the brake is at rest is inhibited due to the wedging action on the block between the wall 74 of the shell and the diagonally disposed metal side 70 of the block; hence, the tension of the spring 32 connecting the shoes does not result in maladjustment of the block.

While this invention has been described in connection with certain specific embodiments, the principle involved is susceptible of numerous other applications that will readily occur to persons skilled in the art. The invention is, therefore, to be limited only as indicated by the scope of the appended claims.

I claim:

1. A brake comprising a movable member, a friction element for cooperation therewith, a stop for the friction element, a member carried by and movable transversely of the friction element having a side angularly disposed to the path of movement of the member, a support on the friction element for the member, and a lever pivoted on the friction element having a part engaging the angularly disposed side of the member and another part for cooperation with the stop, said support providing a bearing for the lever pivot.

2. A brake comprising a movable member, a friction element for cooperation therewith, a stop for the friction element, a member adapted to engage the movable member carried by and movable transversely of the friction element having a part angularly disposed to the path of movement of the member, a lever fulcrumed on the friction element having a part engaging the angularly disposed side and another part for cooperation with the stop, a shell fixed to the friction element housing the transversely movable member and the lever fulcrum, and spring means within the shell holding the lever and member toward the friction element.

3. A brake comprising a rotatable drum, a friction element for cooperation therewith, a stop associated with the friction element, a drum engaging member carried by and movable transversely of the friction element having a side angularly disposed to the path of movement of the member, a support for the member fixedly secured on the friction element, and a lever fulcrumed on the friction element having one end operatively abutting the member and having its opposite end cooperating with the stop, said member being movable along the support.

4. A brake comprising a fixed support, a rotatable drum associated therewith, a friction element on the support having a lining for cooperation with the drum, a retractile stop for the element, a drum engaging member of impervious material carried by and movable transversely on the element having a side angularly disposed to the path of movement of the element, a lever fulcrumed on the friction element, a driver on the lever adapted to engage the stop, an arm forming part of the lever bearing on the member, a shell fixed to the friction element housing the member and the lever fulcrum, and springs acting independently upon the lever and the member holding them frictionally against the friction element.

5. A brake comprising a movable member, a friction element for cooperation therewith, a stop for the friction element, a member carried by and movable transversely of the friction element having a side diagonally disposed to its other side, a lever fulcrumed on the friction element having a part contiguous the diagonally disposed side of the member, and another part for cooperation with the stop, and means fixedly secured on the friction element for supporting the member in abutting relation to the lever providing a bearing for the lever fulcrum and having means for frictionally clamping the member to the friction elements.

6. A brake comprising a rotatable drum, a friction element for cooperation therewith, a retractile stop for the friction element, a member carried by and movable radially relative to the friction element having a part adapted for cooperation with the drum and another part angularly disposed to the path of movement of the member, a support for the member, and a lever fulcrumed between the friction element and support having arms of different radii, the end of the short arm of the lever abutting the member to provide for slidable movement of the member on the support.

7. A brake comprising a movable element, a friction element for cooperation therewith, an adjustable retractile stop for the friction element, a member carried by and movable transversely of the friction element, a lever fulcrumed on the friction element adapted to cooperate with the movable element and having a part angularly disposed to the path of movement of the member, a shell on the friction element sheltering the member and lever fulcrum and constituting a support for slidable movement of the member transversely of the friction element, said lever having one part engaging the stop and another part engaging the angularly disposed part of the member holding the member toward its support on the shell.

8. A brake comprising a fixed support, a rotatable drum associated therewith, a friction element on the support for cooperation with the drum, a retractile stop for the friction element, a shell fixed on the friction element, a member housed within the shell and carried by and movable transversely of the friction element and having a side slidable along an inner wall of the shell, said member having a side cooperating with the drum and a part disposed diagonally to the path of movement of the member transversely of the friction element, and a lever fulcrumed on the friction element within the shell having a part abutting the diagonally disposed side of the member and another part for cooperation with the stop.

HARVEY C. SWIFT.